US012216797B2

(12) United States Patent
Wyatt et al.

(10) Patent No.: US 12,216,797 B2
(45) Date of Patent: *Feb. 4, 2025

(54) USING FAKE PERSONAL DATA TO CREATE A POLICY TO PROTECT PERSONAL INFORMATION ON CLIENT COMPUTING DEVICES

(71) Applicant: Lookout, Inc., Boston, MA (US)

(72) Inventors: Timothy Micheal Wyatt, Toronto (CA); Kevin Patrick Mahaffey, San francisco, CA (US); David Luke Richardson, San Francisco, CA (US); Brian James Buck, Livermore, CA (US); Marc William Rogers, Moraga, CA (US)

(73) Assignee: Lookout, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,931

(22) Filed: Jun. 10, 2024

(65) Prior Publication Data

US 2024/0330509 A1 Oct. 3, 2024

Related U.S. Application Data

(63) Continuation of application No. 17/228,159, filed on Apr. 12, 2021, now abandoned, which is a
(Continued)

(51) Int. Cl.
*G06F 21/62* (2013.01)
*H04L 9/40* (2022.01)
(Continued)

(52) U.S. Cl.
CPC .......... *G06F 21/6245* (2013.01); *H04L 63/20* (2013.01); *H04W 12/02* (2013.01); *H04W 12/08* (2013.01); *H04W 88/02* (2013.01)

(58) Field of Classification Search
CPC ..... H04W 12/02; H04W 12/08; H04W 88/02; G06F 21/6245; H04L 63/20
See application file for complete search history.

(56) References Cited

U.S. PATENT DOCUMENTS 8,099,472 B2    1/2012  Mahaffey et al.
9,973,534 B2    5/2018  Mahaffey et al.
(Continued)

OTHER PUBLICATIONS

U.S. Appl. No. 14/063,342, entitled "System and Method for Creating and Assigning a Policy for a Mobile Communications Device Based On Personal Data," filed Oct. 25, 2013, now U.S. Pat. No. 9,642,008.
(Continued)

*Primary Examiner* — Jinsong Hu
*Assistant Examiner* — Farideh Madani
(74) *Attorney, Agent, or Firm* — Dergosits & Noah LLP; Michael E. Dergosits

(57) ABSTRACT

Systems and methods are described for managing personal data on a client computer, in which personal data associated with the client computer is identified by a policy management module. An analysis may be performed for the client computer by a server using fake personal data. To identify applications which may attempt to access the personal data, the fake personal data is tracked for access on the client computer. A policy is then created that disallows access of the personal data by any applications identified by the analysis of the client computer as accessing the fake personal data. The policy is then assigned to the client computer.

14 Claims, 10 Drawing Sheets

Related U.S. Application Data continuation of application No. 16/564,678, filed on Sep. 9, 2019, now Pat. No. 10,990,696, which is a continuation of application No. 15/473,252, filed on Mar. 29, 2017, now Pat. No. 10,452,862, which is a continuation of application No. 14/063,342, filed on Oct. 25, 2013, now Pat. No. 9,642,008.

(51) Int. Cl.
*H04W 12/02* (2009.01)
*H04W 12/08* (2021.01)
*H04W 88/02* (2009.01)

(56) References Cited

U.S. PATENT DOCUMENTS

| | | | |
|---|---|---|---|
| 10,452,862 B2 | 10/2019 | Wyatt et al. | |
| 2005/0091272 A1* | 4/2005 | Smith | H04M 1/27457 |
| 2009/0292930 A1* | 11/2009 | Marano | G06F 21/6218 |
| | | | 726/28 |
| 2011/0185280 A1* | 7/2011 | Nakash | G06F 16/957 |
| | | | 709/224 |
| 2012/0203571 A1* | 8/2012 | Crapo | G06Q 10/10 |
| | | | 705/3 |
| 2012/0311659 A1* | 12/2012 | Narain | H04W 12/37 |
| | | | 726/1 |
| 2013/0204996 A1 | 8/2013 | Takazawa | |
| 2014/0289807 A1* | 9/2014 | Collado | G06F 21/44 |
| | | | 726/4 |
| 2015/0381806 A1* | 12/2015 | Estrada | H04W 4/08 |
| | | | 379/45 |

OTHER PUBLICATIONS

U.S. Appl. No. 15/473,252, entitled "System and Method for Creating and Assigning a Policy for a Mobile Communications Device Based On Personal Data," filed Mar. 29, 2017, now U.S. Pat. No. 10,452,862.

U.S. Appl. No. 16/564,678, entitled "Methods and Systems for Detecting Attempts To Access Personal Information On Mobile Communications Devices," filed Sep. 9, 2019, now U.S. Pat. No. 10,990,696.

U.S. Appl. No. 17/228,159, entitled "Detecting an Attempted Access of Personal Information On Client Computing Devices" filed Apr. 12, 2021.

* cited by examiner

USING FAKE PERSONAL DATA TO CREATE A POLICY TO PROTECT PERSONAL INFORMATION ON CLIENT COMPUTING DEVICES

CROSS-REFERENCE TO RELATED APPLICATIONS

This application is a continuation of U.S. patent application Ser. No. 17/228,159, filed on Apr. 12, 2021, and entitled "DETECTING AN ATTEMPTED ACCESS OF PERSONAL INFORMATION ON CLIENT COMPUTING DEVICES," which is a continuation of U.S. patent application Ser. No. 16/564,678, filed on Sep. 9, 2019, and entitled "METHODS AND SYSTEMS FOR DETECTING ATTEMPTS TO ACCESS PERSONAL INFORMATION ON MOBILE COMMUNICATIONS DEVICES," which is a continuation of U.S. patent application Ser. No. 15/473,252, filed on Mar. 29, 2017, and entitled "SYSTEM AND METHOD FOR CREATING A POLICY FOR MANAGING PERSONAL DATA ON A MOBILE COMMUNICATIONS DEVICE," now U.S. Pat. No. 10,452,862, which is a continuation of U.S. patent application Ser. No. 14/063,342, filed on Oct. 25, 2013 and entitled "SYSTEM AND METHOD FOR CREATING AND ASSIGNING A POLICY FOR A MOBILE COMMUNICATIONS DEVICE BASED ON PERSONAL DATA," now U.S. Pat. No. 9,642,008, which are hereby incorporated by reference along with all other references cited in this application.

FIELD

The present disclosure relates to policies. In some embodiments, the disclosure relates to creating and assigning a policy for a mobile communications device based on personal data.

BACKGROUND

Conventional data security systems and methods may be designed to prevent the leakage (e.g., unauthorized access or transmission) of data. Such conventional systems and methods typically generate and implement security measures for a business or enterprise environment. A corporation may wish to restrict access to sensitive material stored on a corporate computer or server. For example, the corporation may wish to restrict access to private corporate information, intellectual property, financial documents, and customer information. A security measure may be created and implemented in order to restrict access to this type of sensitive information.

Examples of such security measures include implementing a firewall, intrusion detection systems, antivirus software, or other such systems to prevent unauthorized access to sensitive data. Other types of conventional security measures include the utilization of machine learning algorithms to identify abnormal access of sensitive data, monitoring of computer system behavior, and mechanisms to detect unauthorized attempts to copy sensitive information.

However, such conventional data security systems and methods are not suitable for use with a mobile communications device. For example, the type of data associated with the mobile communications device tends to be personal data of a user of the device as opposed to corporate or enterprise level information. As such, what is needed are systems and methods for creating and assigning a policy to a device. For example, a policy may be created based on personal data and/or personal use of a mobile communications device and the policy may be used to prevent the unauthorized access or leakage of personal data on the mobile communications device.

SUMMARY

In some embodiments, a method may identify one or more locations for storing data on a mobile communications device and identify personal data stored at the one or more locations on the mobile communications device. The method may further generate a policy for the mobile communications device based on the personal data and identify a set of personal data associated with the mobile communications device based on the policy. A set of personal data on the mobile communications device may be monitored and an access of the monitored set of personal data by an application executed on the mobile communications device may be detected. The method may be performed by the mobile communications device, a server, or a combination of both. For example, some of the steps of the method may be performed by the mobile communications device and other steps of the method may be performed by the server.

In some embodiments, the identifying of the set of personal data on the mobile communications device is based on using the policy to identify additional personal data stored on the mobile communications device. In the same or alternative embodiments, the set of personal data includes the identified personal data stored at the one or more locations on the mobile communications device and the identified additional personal data. Furthermore, the personal data may include data from at least one of a contacts database, email database, a database containing communications received or transmitted by the mobile communications device, or location information of the mobile communications device. In some embodiments, the step of detecting the access of the monitored data involves determining if the access resulted in a transmission of at least part of the monitored set of personal data from the mobile communications device. In the same or alternative embodiments, the application is associated with a container wrapper and the step of detecting the access of the monitored set of personal data is based on an interface of the container wrapper. For example, the application may be contained within the container wrapper and instances of the application interacting with an interface of the container wrapper (e.g., through a function call to access personal data external to the container wrapper) may be identified. In alternative embodiments, the monitored set of personal data is associated with a container wrapper and the step of detecting the access of the monitored set of personal data is based on an interface of the container wrapper. For example, the monitored personal data may be contained within the container wrapper and instances of the application interacting with the interface of the container wrapper (e.g., through a function call to the container wrapper to access the personal data) may be identified.

In some embodiments, a method may identify personal data associated with a mobile communications device and receive an analysis associated with the mobile communications device from a server. A policy for the mobile communications device may be generated based on the personal data associated with the mobile communications device and the analysis from the server. The policy may be assigned to the mobile communications device and data on the mobile communications device may be monitored based on the policy. Furthermore, an access of the monitored data by an application that is executed on the mobile communications device may be detected. In some embodiments, the mobile communications device identifies the personal data associated with the mobile communications device and transmits the identification of the personal data to a server that generates the policy. In an alternative embodiment, the mobile communications device generates the policy after identifying the personal data and receiving the analysis from the server.

In some embodiments, the analysis from the server is at least partly based on one or more applications installed on the mobile communications device. Furthermore, the analysis may be at least partly based on known access to data performed by at least one application installed on the mobile communications device.

In some embodiments, a method may identify a first set of personal data associated with a mobile communications device and create a policy based on the first set of personal data associated with the mobile communications device. A second set of personal data associated with the mobile communications device may be identified based on the policy. The second set of personal data may comprise the first set of personal data and additional personal data. The second set of personal data associated with the mobile communications device may be monitored and access of the second set of personal data by at least one application executed on the mobile communications device may be detected.

In some embodiments, a notification of the detecting of access of the second set of personal data may be displayed. The notification may identify the application accessing the second set of personal data and an option to allow for the access or not allow the access.

DETAILED DESCRIPTION

Figure 1:
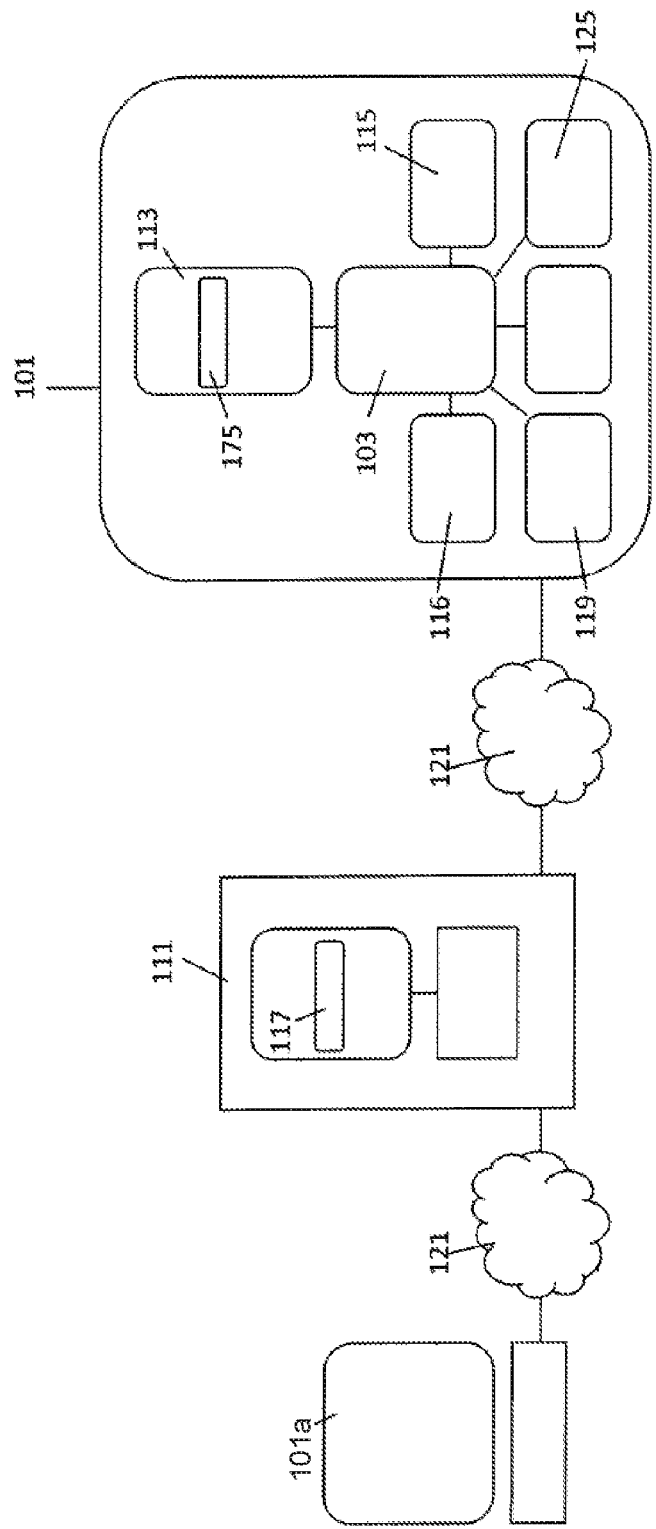
FIG. 1 illustrates a diagram of an example system for creating and assigning a policy for an electronic device in accordance with some embodiments.

The present disclosure may be implemented in numerous ways including, but not limited to, as a process, an apparatus, a system, a device, a method, or a computer readable medium such as a non-transitory computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present disclosure. Applications may also include web applications, which include components that run on the device in a web browser. In this specification, these implementations, or any other form that the disclosure may take, may be referred to as techniques. In general, the order of the steps of disclosed methods may be altered within the scope of the disclosure, except in those instances where it is specified that the order of steps must be in a particular sequence.

As used herein, the term "mobile communications device" may refer to mobile phones, PDAs and smartphones. The term "mobile communications device" may also refer to a class of laptop computers which run an operating system that is also used on mobile phones, PDAs, or smartphones. Such laptop computers are often designed to operate with a continuous connection to a cellular network or to the internet via a wireless link. The term "mobile communications device" excludes other laptop computers, notebook computers, or sub-notebook computers that do not run an operating system that is also used on mobile phones, PDAs, and smartphones. Specifically, mobile communications devices include devices for which wireless communications services such as voice, messaging, data, or other wireless Internet capabilities are a primary function.

As used herein, a "mobile communications device" may also be referred to as a "device," "mobile device," "mobile client," "electronic device," or "handset." However, a person having skill in the art will appreciate that while the present disclosure refers to systems and methods being used on mobile communications devices, the present disclosure may also be used on other computing platforms including, but not limited to, desktop, laptop, notebook, netbook, or server computers.

As used herein, the term "client computer" may refer to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

Prior to describing in detail systems and methods for creating and assigning a policy for an electronic device based on personal data, a system in which the disclosure may be implemented shall first be described. Those of ordinary skill in the art will appreciate that the elements illustrated in FIG. 1 may vary depending on the system implementation.

As shown in FIG. 1, the system may include mobile communications devices 101, 101a and a server 111. An example mobile communications device 101 may include an operating system 113, an input device 115, a radio frequency transceiver(s) 116, a visual display 125, and a battery or power supply 119. Each of these components may be coupled to a central processing unit (CPU) 103. The mobile communications device operating system 113 runs on the CPU 103 and enables interaction between application programs and the mobile communications device hardware components. In some embodiments, the mobile communications device 101 receives data through an RF transceiver(s) 116 which may be able to communicate via various networks including, but not limited to, Bluetooth, local area networks such as Wi-Fi, and cellular networks such as GSM or CDMA.

In some embodiments, a local software component 175 is an application program that is downloaded to a mobile communications device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. Pat. No. 8,099,472, entitled "SYSTEM AND METHOD FOR A MOBILE CROSS-PLATFORM SOFTWARE SYSTEM," incorporated herein by reference. In another embodiment, the local software component 175 can be device, platform or operating system specific.

The mobile communications device 101 may access a communications network 121 that permits access to a server 111. The server 111 may also be accessed by another mobile communications device 101a via network 121. The network 121 will normally be the Internet but can also be any other communications network. Alternatively, the mobile communications device 101 may access the server 111 by a different network than the network the other mobile communications device 101a accesses the server 111. In some embodiments, the server 111 is provided with server software 117. The server software 117 on the server 111 provides functionality to allow two-way communication between the server 111 and the mobile communications devices 101, 101a through the network 121. The server software 117 allows data, such as location-related information, pictures, contacts, videos, SMS messages, call history, event logs, and settings to be transferred from the mobile communications device 101 to the other mobile communications device 101a and vice versa.

It is understood by those of ordinary skill in the art that the functionality performed by server 111 does not necessarily have to be accomplished on a single hardware device. In this context, the use of the term server is intended to refer to one or more computers operating in cooperation or collaboration to provide the functionality described herein. The computers may be co-located or in different locations. The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality. S3 (simple storage system), from Amazon, Inc. is such a data storage service which may be utilized by separate set of computers to enable the present invention.

It should be understood that the arrangement of electronic mobile communications device 101 illustrated in FIG. 1 is but one possible implementation and that other arrangements are possible. It should also be understood that the various system components defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile communications device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the disclosure described herein can be embodied in many different variations, and all such variations known to those of ordinary skill are contemplated to be within the scope of what is claimed.

In the description that follows, the disclosure will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the disclosure is being described in the foregoing context, it is not meant to be limiting as those of skill in the art will appreciate that various of the acts and operation described hereinafter may also be implemented in hardware.

Figure 2:
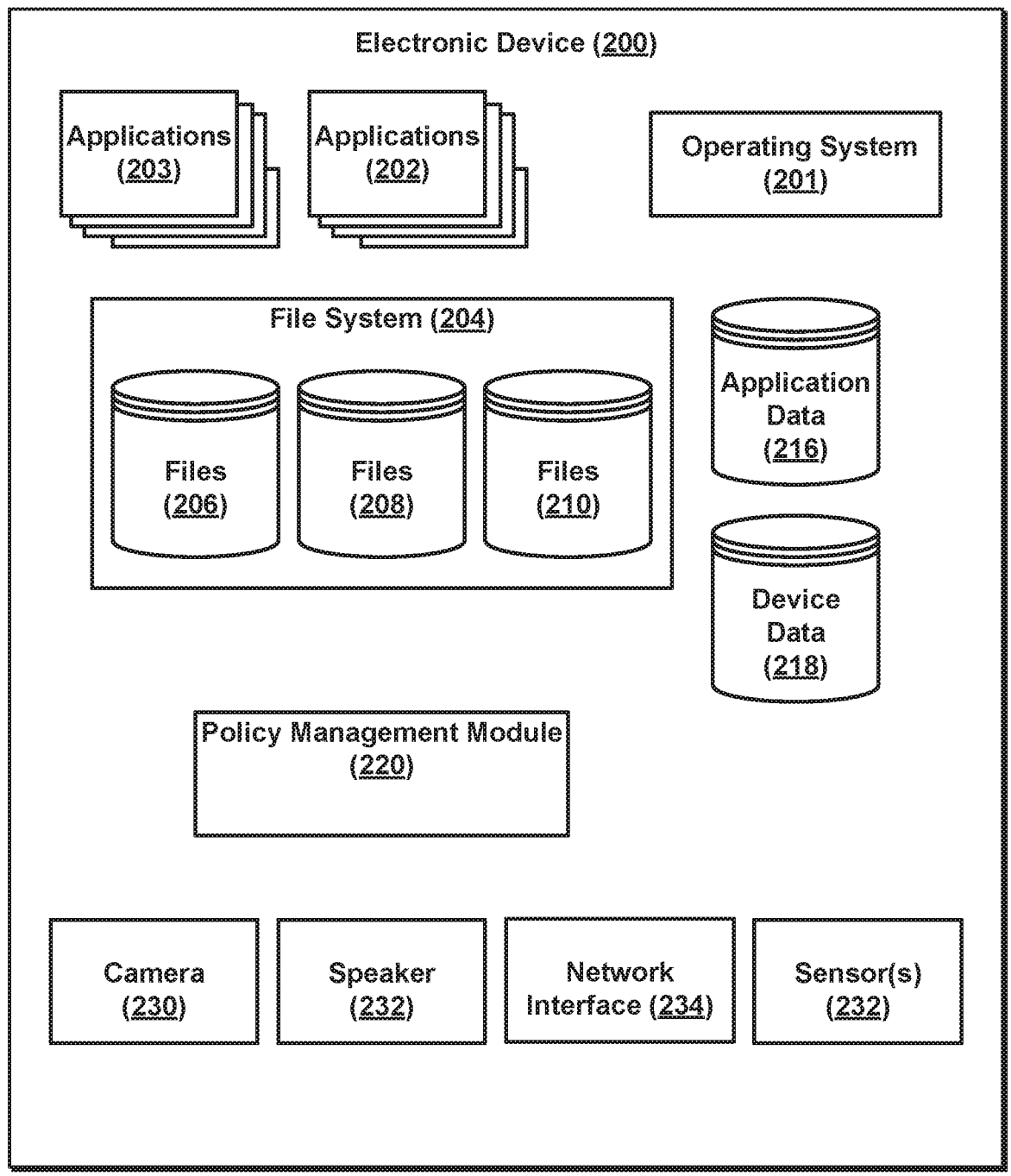
FIG. 2 illustrates a block diagram of an electronic device in accordance with some embodiments of the disclosure.

FIG. 2 illustrates a block diagram of an electronic device 200 in accordance with some embodiments of the disclosure. In general, the electronic device 200 may comprise a plurality of modules and components including a policy management module to create and assign a policy.

As shown in FIG. 2, the electronic device 200 may be configured to provide an execution environment to host at least one operating system 201, a plurality of applications 202 and 203, and a file system 204. In some embodiments, each of the plurality of applications 202 and 203 may include executable code, which when executed by a processor (e.g., CPU 103), may provide a service or function of the electronic device 200. Each of the plurality of applications 202 or 203 may be associated with at least a part of the application data 216. In the same or alternative embodiments, one or more of the plurality of applications 202 or 203 may access any of the file system 204 comprising file sources 206, 208, and 210, application data 216, device data 218, camera 230, speaker 232, network interface 234, and sensor(s) 232. For example, the electronic device 200 may host or run a plurality of applications 202 and 203. A first application may access or retrieve data from application data 216 and file source 206 from the file system 204. A second application may access or retrieve data from the device data 218 and file sources 208 and 210 from the file system 204. Furthermore, a third application may retrieve data generated from the camera 230 and sensor(s) 232 and access the network interface 234. As such, each of the applications of the plurality of applications 202 and 203 may access various types of data or files stored on the electronic device 200 as well as a functionality (e.g., camera 230, speaker 232, network interface 234, sensor(s) 232) of the electronic device 200.

In some embodiments, the electronic device 200 may also support the operation of a policy management module 220 that may be responsible for creating and assigning policies for the electronic device 200. In some embodiments, the policy management module 220 may operate in the electronic device 200 as a client application hosted by the electronic device 200, as is shown in FIG. 2. In an alternative embodiment, the policy management module 220 may be provided by and integrated within the operating system 201 of the electronic device 200. In either of the embodiments, the policy management module 220 may be configured to manage the creating and applying of policies described herein. In another embodiment, the policy management module 220 may operate on a server in communication with the electronic device 200. For example, the policy management module 220 may be executed on a server and may create the policy to be assigned to the electronic device 200. In some embodiments, the server may receive data (e.g., an identification of personal data) from the electronic device 200, create a policy based on the received data, and then transmit the policy to the electronic device 200. In an alternative embodiment, functions of the policy management module 220 may be distributed between the electronic device 200 and the server. For example, certain components or modules of the policy management module 220 may be executed by the electronic device 200 while other components or modules may be executed by the server. As such, both the electronic device 200 and a server may perform actions associated with the creating and using of a policy as disclosed herein. Further details with regard to the policy management module 220 are discussed in further detail below with relation to FIG. 3. In some embodiments, the application data 216, device data 218, and file system 204 with file sources 206, 208, and 210 may store a plurality of types of information, files, or data. Such information, files, or data may include sensitive personal data. As such, it may be desirable for the user of the electronic device 200 to restrict access to such personal data and/or to be notified when one or more applications from the plurality of applications 202 and 203 executing on the electronic device 200 access the personal data. In some embodiments, the policy management module 220 executing on the electronic device 200 may identify the personal data stored on the electronic device 200, create a policy based on the identified personal data, monitor the identified personal data based on the policy, and report any access to the identified personal data based on the policy.

Examples of the previously mentioned data include, but are not limited to, personal data associated with the user of the electronic device 200. For example, the personal data may include personally identifiable information (PII) that may be used to identify the user of the electronic device 200. In some embodiments, the PII may include any information about the user of the electronic device 200 that can be used to distinguish or trace the user's identity as well as information that is linked to the user of the electronic device 200. Examples of such PII include, but are not limited to, the user's name, social security number, date and place of birth, mother's maiden name, driver's license number, passport number, firearm owner's identification card, username, email address, security questions and answers, digital certificates associated with the user, gender, marital status, race, religion, salary, biometric information (e.g., height, weight, eye color, hair color, fingerprint scans, retinal scans, medical information), financial information (e.g., credit card numbers, verification codes, expiration dates, debit card numbers, bank account numbers), family information (e.g., dependents, children, spouse, parents), emergency contact information, etc. These are just some examples of PII.

Additional examples of personal data associated with the user of the electronic device 200 may include, but are not limited to, contacts of the user of the electronic device 200 (e.g., an address book or phone number contact list), short message service (SMS) contacts, SMS messages transmitted or received by the user of the electronic device 200, email contacts, email database (e.g., the electronic device 200 may store emails from an email account of the user), email messages transmitted or received by the electronic device 200, phone logs, web logs or browser history (e.g., which websites has the user of the electronic device 200 visited), cookies, and phone numbers.

Further examples of personal data may include information that may be used to identify the electronic device 200. For example, the personal data may include, but is not limited to, International Mobile Station Equipment Identity (IMEI), International Mobile Subscriber Identity (IMSI), Integrated Circuit Card Identifier (ICCID), Mobile Equipment Identifier (MEID), Electronic Serial Numbers (ESN), Unique Device Identifier (UDID), Media Access Control (MAC) Address, the applications that are installed on the electronic device 200 (e.g., plurality of applications 202 and 203), and a phone number associated with the electronic device 200.

Still further examples of personal data may include data from one or more components of the electronic device 200 (e.g., camera 230, speaker 232, network interface 234, sensor(s) 232). For example, the personal data may include images or photos taken by the camera 230, location information from the sensor 232 of the electronic device 200 (e.g., a current physical location of the electronic device 200), a location history of the electronic device 200, or a log or history of domains, IP addresses, other devices that the electronic device 200 has communicated with. Additionally, location information or other PII may be embedded as metadata, e.g., Exchangeable image file format (Exif) metadata. Such information is usually placed automatically by applications or cameras into image files without the actions of a user.

Additional examples of personal data may include data which can be used to make inferences about other user personal data. For example, an application that obtains repeated process memory size of a browser application's process can use that information to fingerprint which websites the user is visiting. Thus, although the occasional access to process memory size information does not expose personal data, the repeated access to this information can expose personal data. Detection of repeated access and reporting of repeated access to such system level information that can be used for inferences about other personal data may also be included as personal data. Another example of system related information which can be used to infer personal data is the set of plugins or extensions installed in a browser application. Research has shown that the combination of the browser's user-agent string and the list of installed plugins or extensions can fingerprint a user that may be used to uniquely identify a particular device or user. Thus, an application that attempts to retrieve the complete list of installed plugins or extensions for a browser application can be considered to be accessing another type of personal data. Similarly, devices frequently broadcast the names (SSIDs) of their favorite or recently connected to networks to facilitate discovery and subsequent connection to known or preferred networks. These network names (SSIDs) constitute another example of personal data which can be used to make inferences about other user personal data. For example, the names may reveal recent user locations, user buying preferences, user medical conditions (user's device is trying to connect to "Oncology-Clinic-Free-Wifi") or other items of a personal nature that can be inferred. In such a case it may be advisable to adjust settings or use application wrappers or operating system functions or hooks to prevent the device from broadcasting some or all of such network names according to a privacy policy. Devices can still connect to such networks by passive discovery (listening for network names broadcast from network access points). Such inferred information could be used by a listener for targeting advertisements or tailoring search results presented to a user of the device. Similarly, an application running on the device may attempt to obtain this list of recently used network names (SSIDs).

As such, the personal data may include PII data, application related information (e.g., which applications are installed on the electronic device 200), device related information (e.g., identifiers associated with the device), communication related information (e.g., phone logs, emails, SMS messages, etc.), information obtained by the device (e.g., location information), or any personal files or data stored by the user (e.g., files in the file system 204). Such data may be personal to the user and use of the electronic device 200.

Figure 3:
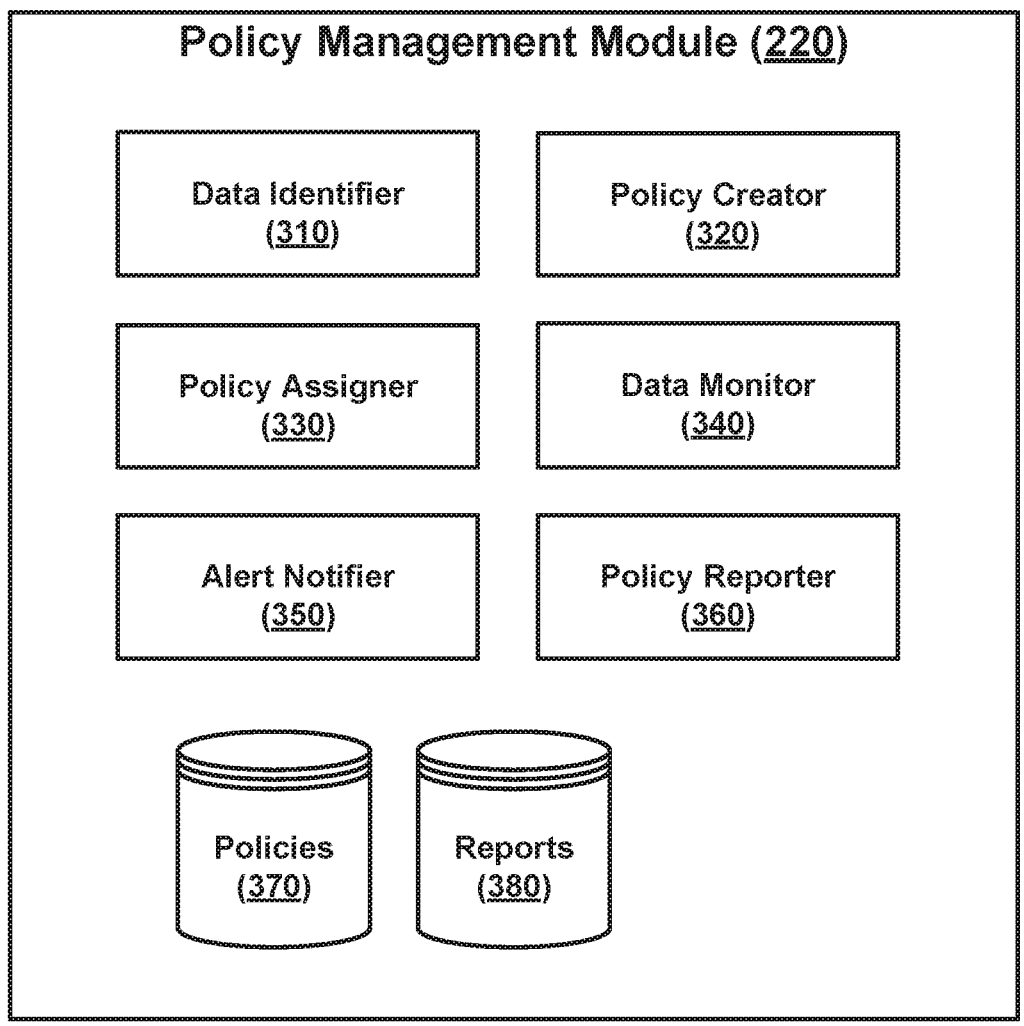
FIG. 3 illustrates a block diagram of a policy management system or module to create and assign a policy to an electronic device in accordance with some embodiments.

FIG. 3 illustrates a block diagram of a policy management module 220 to create and to assign a policy for a mobile communications device (e.g., electronic device 200). In general, the policy management module 220 may create and assign a policy for a mobile communications device. In some embodiments, the policy management module 220 may be executed on the mobile communications device. In alternative embodiments, the policy management module 200 may be executed from a server. In another embodiment, components or modules of the policy management module 200 may be distributed between the mobile communications device and the server.

As shown in FIG. 3, the policy management module 220 may comprise a data identifier module 310. In some embodiments, the data identifier module 310 may identify data associated with the electronic device 200. For example, the data identifier module 310 may identify personal data of a user of the electronic device as previously disclosed. In some embodiments, the data identifier module 310 may identify locations on the electronic device 200 (e.g., areas in the file system 204) that are storing the personal data and may further identify types of personal data that is stored on the electronic device 200 or may identify a use of the electronic device 200. The policy management module 220 may further comprise a policy creator module 320. In some embodiments, the policy creator module 320 may create a policy based on the personal data identified by the data identifier module 310. The policy may be created for the electronic device 200 based on the personal data that is stored on the electronic device 200 and the personal use by the user of the electronic device 200. Further detail with regards to identifying data (e.g., by the data identifier module 310) and creating a policy (e.g., by the policy creator module 320) are disclosed in further detail below with relation to FIGS. 5 and 6.

As shown in FIG. 3, the policy management module 220 may further comprise a policy assigner module 330. In some embodiments, the policy assigner module 330 may assign a policy to the electronic device 200. In some embodiments, a plurality of policies may be available to the policy assigner 330. For example, the policies storage 370 may comprise a plurality of policies that have been created for the electronic device 200 and the policy assigner 330 may select one of the plurality of policies that are located in the policies storage 370. As shown, the policy management module 220 may further include a data monitor module 340. In some embodiments, the data monitor module 340 may monitor personal data that has been identified by the data identifier module 310 and/or personal data that is subject to the policy assigned by the policy assigner module 330. Further details with regard to monitoring data (e.g., by the data identifier module 330) are disclosed with relation to FIG. 8. As shown in FIG. 3, the policy management module 220 may further include an alert notifier module 350. In some embodiments, the alert notifier module 350 may receive an indication from the data monitor module 340 that an access of personal data subject to the policy assigned by the policy assigner module 330 has been detected. In response to such detection, the alert notifier module 350 may notify the user of the electronic device 200 of the detection of an instance of an application accessing the personal data. Further details with regard to such notifications (e.g., by the alert notifier module 350) are disclosed with relation to FIG. 10. The policy management module 220 may further include a policy reporter module 360. In some embodiments, the policy reporter module 360 may receive notifications from the alert notifier 350 of access to personal data by one or more applications. The policy reporter module 360 may aggregate the notifications that are received from the alert notifier 350 and generate a report comprising information detailing which applications (e.g., applications from the plurality of application 202 and 203) have accessed personal data. The generated report may be stored in the reports storage 380 and may further be presented to a user of the electronic device 200. Further details with regard to the generation and presentation of reports (e.g., by the policy reporter module 360) are disclosed with relation to FIG. 9.

Figure 4:
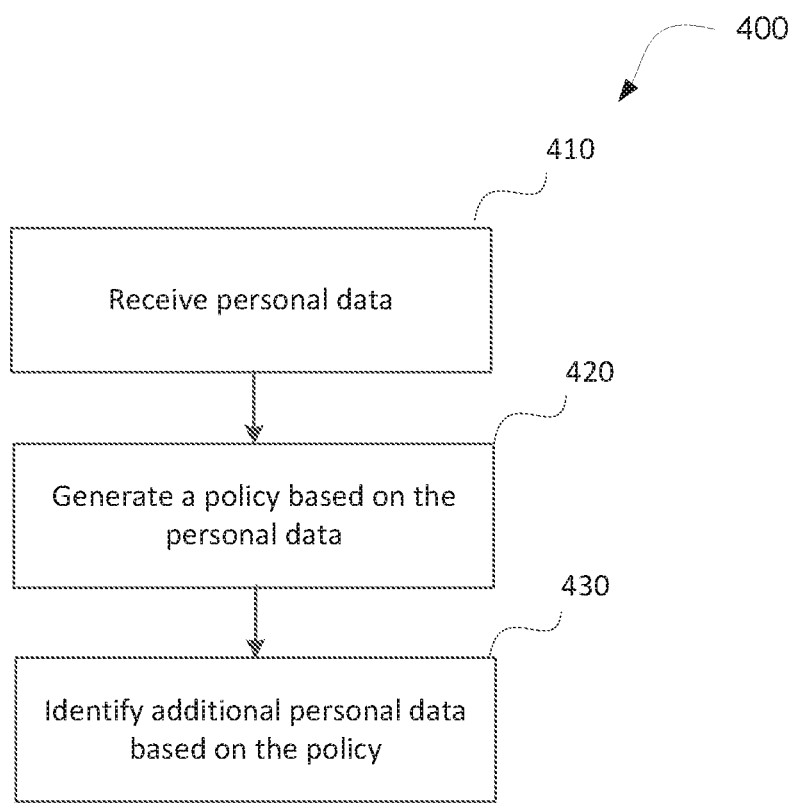
FIG. 4 illustrates a flow diagram of an example method of using personal data and a policy in accordance with some embodiments.

FIG. 4 illustrates a flow diagram of a method 400 for using personal data and a policy. As shown, at step 410, personal data may be received. For example, the data identifier module 310 of the policy management module 220 may receive or identify personal data stored in memory on the mobile communications device. In some embodiments, the personal data may be stored on the electronic device 200. At step 420, a policy may be generated based on the personal data. For example, the policy creator module 320 of the policy management module 220 may create or generate the policy based on the personal data that was received at step

410. In some embodiments, the policy may comprise a set of instructions used to identify data and/or actions to be performed for the identified data. For example, the policy may be a data leakage policy that is used to identify different types of data stored on the electronic device 200, monitor the different types of data, and/or control access to the different types of data. In some embodiments, the policy may be generated based on some amount of personal data in order to identify additional personal data. For example, a plurality of personal data may be stored on the electronic device 200. A subset of the plurality of personal data may be identified or received by the policy management module 220 and a policy may be generated based on the subset of the personal data stored on the electronic device 200. The policy may then be used to identify additional personal data stored on the electronic device 200. As such, the policy may be created based on a smaller set of personal data and then used to detect or identify a larger set of personal data. Thus, at step 430, additional data may be identified based on the created policy.

As such, the policy may be created based on an initial set of personal data. In some embodiments, the initial set of personal data may be identified based on one or more methods. For example, the initial set of personal data may be identified based on known sources of personal data. Such locations on an electronic device 200 may include, but are not limited to, databases of user information, email databases associated with the electronic device 200 (e.g., locations of stored emails), contact information (e.g., a contact list or phone book on the electronic device 200), SMS information (e.g., SMS messages sent or received on the electronic device 200), etc. As such, there may be one or more defined or known storage locations on the electronic device 200 that contain personal data. The personal data in the defined or known storage locations may then be used to generate a policy to identify additional personal data stored on the electronic device 200. Thus, the policy may be generated based on exact data matching from the defined or known storage locations of personal data.

In some embodiments, the policy may be generated based on indexed document matching. For example, the policy may be generated based on text in one or more known personal data files. Additional data that matches at least some of the text in the one or more known personal data files may then be identified by the policy as personal data that is to be monitored. Thus, the profile may be generated based on text in a document or corpus of documents. In the same or alternative embodiments, personal data may be identified based on data identifiers. For example, a social security number may be identified in a personal data file based on its nine digits and optional dashes. Files that include such a data identifier may be used in the creation of the policy. The policy may further be generated based on a classifier. For example, a classifier (e.g., a Support Vector Machine that analyzes data and recognizes patterns) may analyze a set of personal data files (e.g., from defined or previously known locations on the electronic device 200) sorted by classification and the resulting model may be used to identify additional personal data that matches the classifications of the model.

Thus, the policy may be generated based on known sets of data (e.g., personal data) stored at known locations (e.g., an email account, file system locations, contacts list, etc.) or known uses of the electronic device 200. The policy may then be used to identify additional sets of data (e.g., additional personal data) stored at other locations on the electronic device 200.

Figure 5:
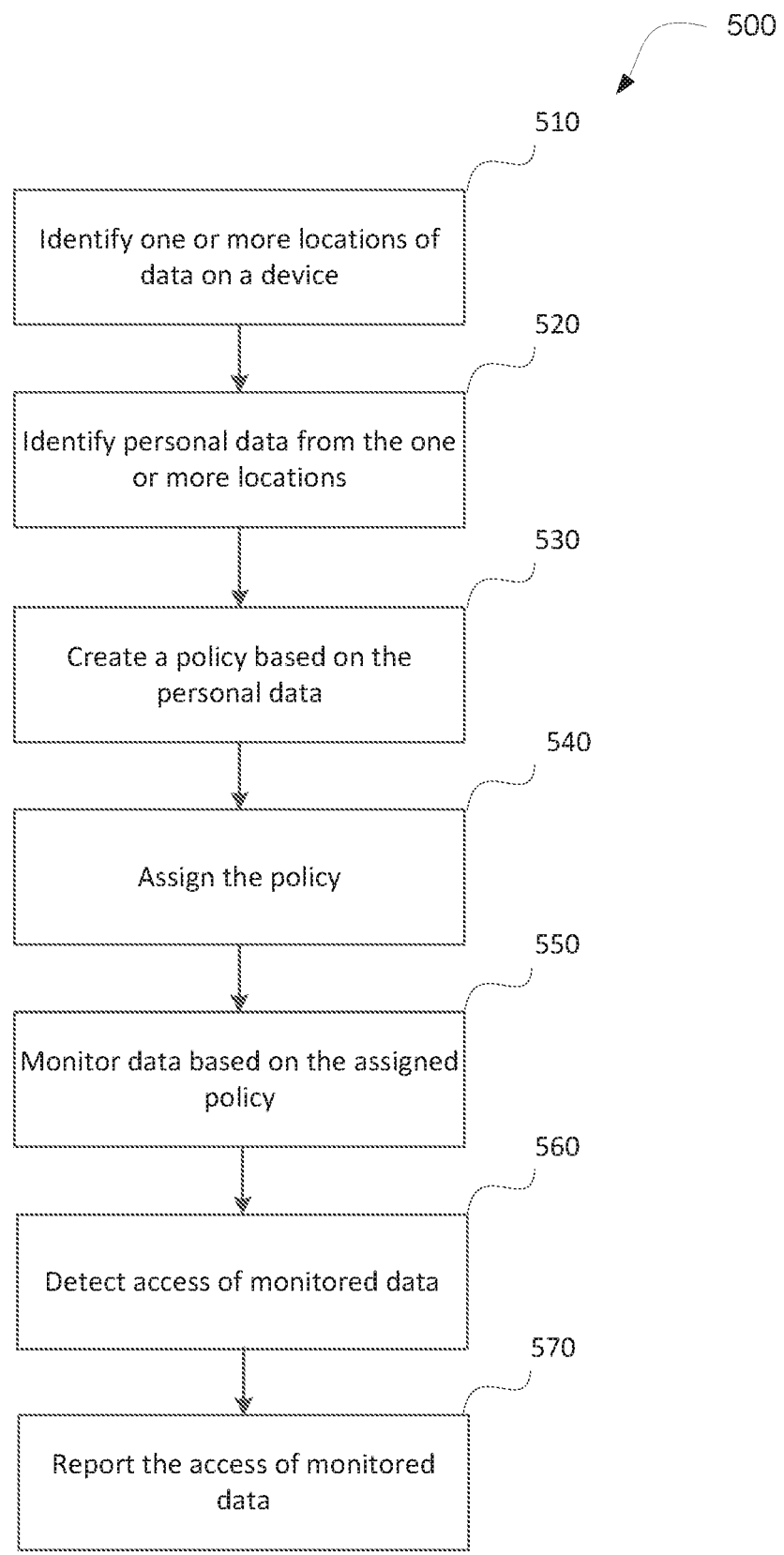
FIG. 5 illustrates a flow diagram of an example method to create and assign a policy to an electronic device in accordance with some embodiments of the disclosure.

FIG. 5 illustrates a flow diagram of a method 500 to create and assign a policy to an electronic device (e.g., electronic device 200). In general, the method 500 may be performed by the policy management module 220 to report access of monitored personal data by the operating system and/or at least one application executing on the device.

As shown in FIG. 5, the method 500 may identify, at step 510, one or more locations of stored data on the electronic device. For example, the data identifier module 310 of the policy management module 220 may identify one or more known or predefined locations where personal data is stored on the electronic device. In some embodiments, the one or more known or predefined locations may include, but is not limited to, a location in the file storage system of the electronic device, storage for emails received or downloaded by the electronic device from an email account of the user associated with the electronic device, a storage location for a contacts list (e.g., phone numbers and addresses) associated with the electronic device, and a subscriber identification module (SIM) that may store the IMSI, ICCID, SMS messages, phone book contacts, and other data of the electronic device. At step 520, personal data may be identified from the one or more known or predefined locations. In some embodiments, the data stored in the one or more known or predefined locations may be identified as personal data. For example, the method 500 may identify any data stored on the SIM card, contacts list, email account, etc. as being personal data. Next, at step 530, a policy (e.g., a data leakage policy) may be created based on the personal data identified at step 520. For example, the policy creator 320 of the policy management module 220 may create or generate the policy based on the personal data that has been identified at one or more known or predefined locations on the electronic device 200. In some embodiments, the created policy may also be stored in the policies storage 370. At step 540, the policy may be assigned to the electronic device. For example, the policy assigner module 330 of the policy management module 220 may assign the policy to the electronic device 200. The method 500 may further monitor data based on the assigned policy. For example, the data monitor module 340 of the policy management module 220 may monitor data based on the policy. In some embodiments, the monitored data may be additional personal data (e.g., personal data from a plurality of locations associated with the electronic device) that has matched or been identified by the policy. In the same or alternative embodiments, the monitoring of the data may be performed in response to the assigning of the policy. For example, different personal data may be monitored based on the policy that has been assigned to the electronic device.

At step 560, an access of the monitored data may be detected. For example, the data monitor 340 of the policy management module 220 may detect an application (e.g., from the plurality of applications 202 and 203) that is executed on the electronic device 200 has accessed personal data that has been identified by the policy. In some embodiments, the detected access of the personal data by the application may involve the application accessing the personal data from the file system of the electronic device and/or transferring the personal data from the electronic device to another destination (e.g., a server, another electronic device, etc.) over a network (e.g., the Internet or cellular network). At step 570, the access of the monitored data may be reported. For example, the alert notifier 350 of the policy management module 220 may generate an alert notification for the user of the electronic device and/or the policy reporter 360 of the policy management module 220 may generate a report based on the detection of an application accessing personal data that has been identified by the policy. Further details with regard to reporting the access of the monitored personal data are disclosed with relation to FIGS. 9 and 10.

As such, one or more known or predefined locations or known or predefined sources of personal data stored on an electronic device may be identified. The data from the predefined locations or predefined sources may be identified as personal data. A policy may be created based on the personal data from the predefined locations or predefined sources. The policy may be assigned to the electronic device and the policy may be used to identify additional personal data (e.g., the personal data from the known or predefined locations or sources as well as additional personal data elsewhere on the electronic device). The additional personal data may be monitored. If an application that is executed on the electronic device accesses the monitored personal data, then a user of the electronic device may be notified of the access of the monitored personal data. Furthermore, a report may be created to detail and provide additional information with regard to the access of the personal data on the electronic device.

Figure 6:
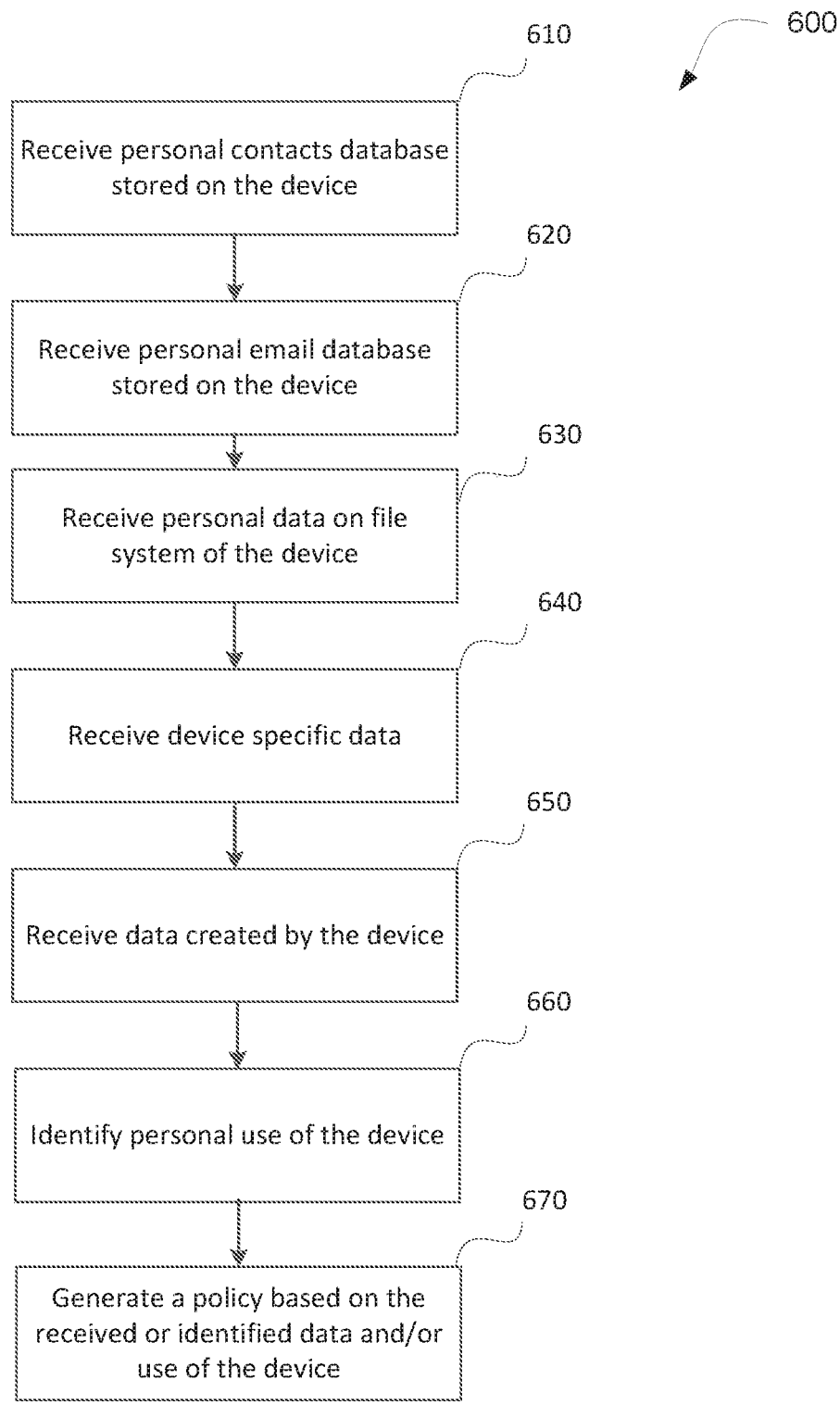
FIG. 6 illustrates a flow diagram of an example method to create a policy based on personal data stored on a device in accordance with some embodiments.

FIG. 6 illustrates a flow diagram of a method 600 to create a policy based on personal data stored on a device. In general, a policy management module 220 may receive or identify a plurality of types of personal data associated with an electronic device 200 and/or a user of the electronic device 200 and may generate a policy based on the personal data.

As shown in FIG. 6, the method 600 may receive, at step 610, a personal contacts database stored on an electronic device 200. The personal contacts database may include contact information from a contact list or phone book stored on the electronic device. In some embodiments, the contact list may comprise information to identify a plurality of phone contacts and a phone history log (e.g., phone numbers and/or identities of users associated with the phone numbers that the electronic device 200 has placed calls to or received calls from). In the same or alternative embodiments, the personal contacts database may also include an SMS log or history and any other identifier used in inbound or outbound communication from the electronic device 200. As such, the method 600 may receive communication-related information associated with the electronic device 200. The communication-related information may be based on the use of the electronic device 200 (e.g., of prior phone calls, prior SMS messages, etc. that were placed or received by the electronic device). Furthermore, at step 620, the method 600 may receive a personal email database stored on the device. The personal email database may include emails from a personal email account that is associated with a user of the electronic device 200. For example, the electronic device 200 may be configured to access one or more personal email accounts of a user and downloads and/or to transmit email messages to and from the electronic device 200. At step 630, the method 600 may receive personal files stored on the file system of the device. For example, any type of personal data stored on the file system of the electronic device 200 may be received. Examples of such personal data may include, but is not limited to, web-related information such as web browser history, browser cookies, browser's installed extensions or plug-ins, HTML5 local storage, and application data and personal-related information of a user of the electronic device. The method 600 may further receive, at step 640, device specific data. For example, device-related information of the electronic device 200 may be received. In some embodiments, the device-related information may include any type of unique identifier associated with the electronic device including, but not limited to, the IMEI, IMSI, ICCID, MEID, ESN, UDID, MAC address, and a phone number. At step 650, data created by the device may be received. For example, photos created from a camera of the electronic device 200, sensor data created by various sensors of the electronic device (e.g., location data from a GPS component), or any type of log or history information created by the electronic device may be received. At step 660, a personal use of the device may be identified. For example, information indicating that a user of the electronic device 200 uses the electronic device to check one or more email accounts, has certain applications installed (e.g., application-related information), uses the electronic device to connect to various websites, uses a telephone functionality of the electronic device 200, uses an SMS functionality of the electronic device 200, uses a camera component of the electronic device 200 to take photos, and has activated a location determination component (e.g., GPS), etc. may be identified. As such, use-related information of the electronic device 200 may be identified.

At step 670, a policy may be generated based on the received or identified data or information. As previously disclosed with relation to FIG. 4, the policy may be generated based on personal data. For example, the policy may be generated based on personal data stored on a mobile communications device. Thus, the policy may be considered a custom policy created specifically for the mobile communications device based on the personal data that is currently stored on the mobile communications device. In some embodiment, the policy may be generated based on the personal data stored on the mobile communications device as well as features of the mobile communications device. Examples of the features of the mobile communications device include, but are not limited to, functionality of the mobile communications device (e.g., a camera, location determination components, etc.) and an operating system executed on the mobile communications device. As such, the generated policy may be at least partly platform specific (e.g., specific to an operating system of the mobile communications device) and/or at least partly based on the personal data stored on the mobile communications device.

Although the steps described above disclose certain types of data or information, any type of personal data or device specific data or information may be used received and/or identified to generate the policy. For example, data on a storage device (e.g., a non-volatile memory card such as a Secure Digital card) coupled to the electronic device 200 may be used to generate the policy.

Figure 7:
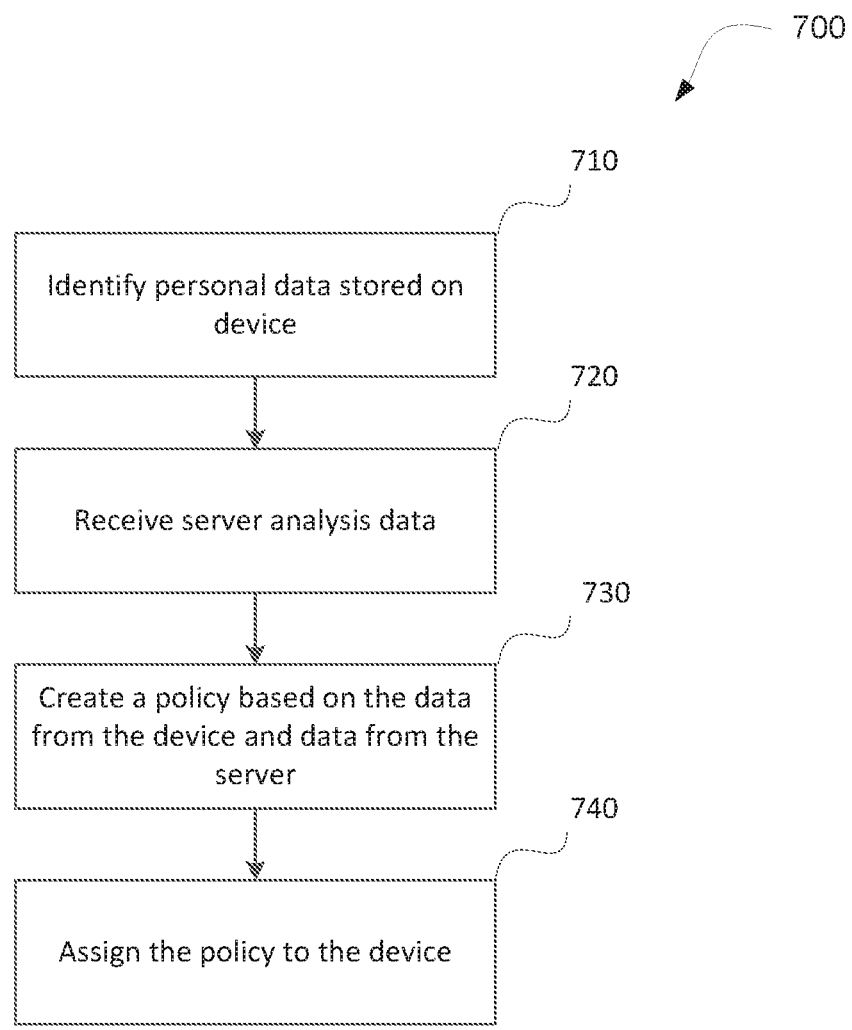
FIG. 7 illustrates a flow diagram of an example method to create a policy based on personal data associated with a device and server data.

FIG. 7 illustrates a flow diagram of a method 700 to create a policy based on personal data associated with a device and data from a server. As shown in FIG. 7, at step 710, an identification of personal data stored on a device may be performed. Such personal data may include any of the types of data associated with the electronic device disclosed herein. At step 720, server data may be received. For example, server analysis data may be received by the policy management module 220 of the electronic device 200. In some embodiments, the server may be a remote server (e.g., a server in communication with the electronic device 200 over a network) and may receive data from the electronic device 200. The server may then analyze the data and transmit data based on the analysis to the electronic device. In some embodiments, the server may receive an identification of specific applications that have been installed and/or are executed on the electronic device 200 and may transmit data based on such identification to the electronic device 200. For example, the server may provide an analysis based on known behavior of the applications that have been installed on the electronic device. Such known behavior may include types of personal data that the installed applications are known to access.

In some embodiments, the server may also create a set of per application data. For example, the server may create fake or false personal data and transmit the fake or false personal data to the electronic device 200. As such, the fake or false personal data may be unique and access of the fake or false personal data may be monitored (e.g., by the policy management module 220). The fake or false personal data generated may be unique to the particular application, or may be unique to the particular device, or may be unique to the particular user who is using the device, or may be unique to any combination of the above. If any application accesses the fake or false personal data, then the access may be tracked (e.g., determine if the fake or false data was transmitted off of the electronic device 200 over a network) and the server and/or electronic device may identify the application that has accessed the fake or false personal data. Furthermore, a report may be generated to alert the user that the application is accessing the fake or false personal data. Additionally, any subsequent detection of the attempted use of the unique fake or false personal data (e.g., a fake phone number or fake email address) by receiving a communication at the unique fake or false address may result in reporting the usage to the user, identifying that the application for which the fake or false data was generated is an abuser of personal data (e.g., the application is attempting unauthorized access of personal data), and tracking the origin of the communication involving the fake or false address. A policy to disallow access by such an application to personal data may be created and distributed to multiple devices. In a specific embodiment, a known data leaking app or website may be provided with fake information in response to any attempts by the app or website to obtain personal data. In another embodiment apps or web applications can in a laboratory setting be run in a dynamic analysis or emulator farm which is capable of in depth instrumentation on all operations of the app or web application, e.g., crashes, locations accessed on the device or on the network, any personal data access or leakage, type and contents of network traffic, memory usage growth, processor usage over time, number of calls or SMS or other messages sent. Such apps or web applications in the laboratory can be provided with fake data, e.g., email addresses or phone numbers. Subsequent detection of messages or calls to these identifiers can characterize the app or website application as leaking personal data. Such characterization can be used to formulate specific policy for said app or website application, or for other apps or website applications developed by the same developer (as indicated by app signature) or organization (as indicated by domain of the web application). Additionally, app developers can be notified if the developer's app or website application is exhibiting insecure behavior or is capturing or transmitting or otherwise using personal data.

Returning to FIG. 7, at step 730, the policy may be created based on the data associated with the device and the data associated with the server. Furthermore, at step 740, the policy may be assigned to the electronic device.

In some embodiments, the policy may be created based on personal data associated with a plurality of devices. For example, different types of personal data may be stored on different devices. A policy may then be generated based on the different types of personal data on the plurality of devices and the policy may be applied to each of the plurality of devices. For example, devices may exchange the identification of the personal data with each other or may transmit to a server the identification of the personal data. The server may optionally provide server analysis data as previously disclosed and may receive the identification of the personal data from the plurality of devices and generate a policy based on the personal data from the plurality of devices. The policy may then be transmitted back to each device and assigned to each of the devices. Thus, a portable policy (e.g., a policy applied to any mobile device) may be created at the server and applied to a plurality of devices.

Figure 8:
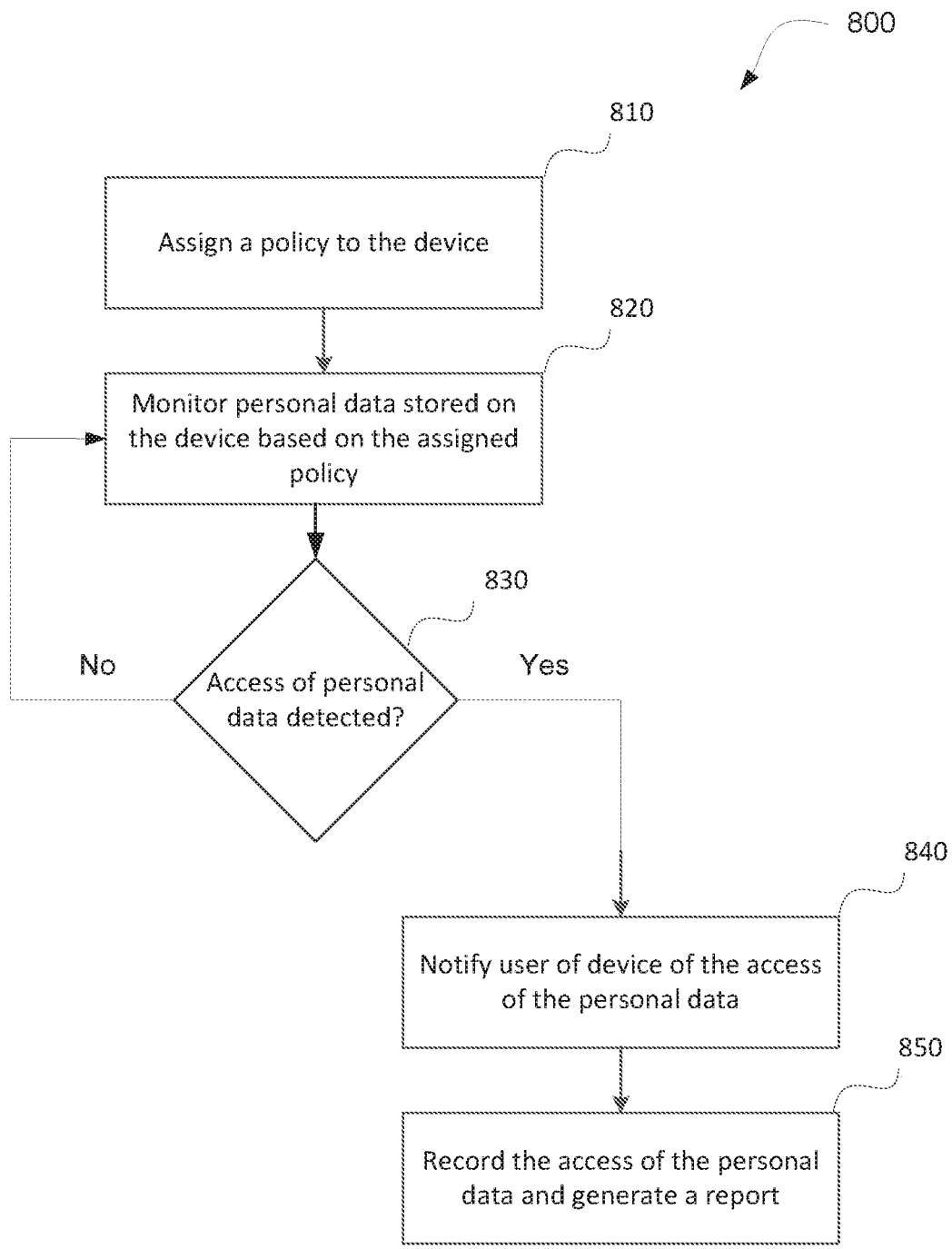
FIG. 8 illustrates an example method to monitor data and record access of the monitored data based on a policy in accordance with some embodiments.

FIG. 8 illustrates a method 800 to monitor data and record access of the monitored data based on the application of a policy. In general, the data monitor module 340 of the policy management module 220 may monitor personal data identified by the policy as data for which access should be monitored and the alert notifier module 350 and policy reporter 360 of the policy management module 220 may alert a user of the electronic device 200 of access of personal data and generate a report aggregating a plurality of detected accesses of personal data by one or more applications.

As shown in FIG. 8, at step 810, a policy may be assigned to the electronic device. For example, the policy may be assigned by the policy management module 220. At step 820, personal data associated with the electronic device may be monitored based on the assigned policy. For example, the assigned policy may be used to identify personal data that is accessible by the electronic device. Such identified personal data may then be monitored for access by one or more applications executed on the electronic device. At step 830, a determination may be made as to whether access of the personal data that has been monitored at step 820 has been detected. If no such access has been detected, then the method 800 may return to monitoring the personal data at step 820. However, if a detection of the personal data occurs, then at step 840, a user of the electronic device may be notified of the application that has accessed or is attempting to access the monitored personal data. For example, an alert notification may be displayed on a screen of the electronic device and comprise information indicating that a specific piece of personal data is being accessed by a particular application. In some embodiments, the alert notification may also include options to allow or disallow the attempted access of the personal data by the application. Further details with regard to such an alert notification are disclosed with relation to FIG. 10. Furthermore, at step 850, the access or attempted access of the monitored personal data by the application may be recorded and/or aggregated (e.g., with other reported access of personal data by applications) to be included in a generated report. Further details with regard to such a report are disclosed with relation to FIG. 9. In some embodiments, the method may return to the monitoring of access to the personal data at step 820 after such notifications and/or generation of such reports.

In some embodiments, access of the personal data by one or more applications (e.g., at step 830) may be detected by various methods. Examples of such methods include, but are not limited to, configuring the operating system of the electronic device to detect such access (e.g., the policy management module 220 is a part of the operating system), monitoring system logs and/or file system logs (e.g., identifying access of personal data from scanning the file system logs), and inserting the policy management module 220 as a browser plug-in and detecting if a browser is accessing personal data on the electronic device.

In some embodiments, the access of the personal data may be detected based on application containerization or electronic device containerization (e.g., mobile device containerization). The containerization may involve an approach to create separate environments for applications and/or personal data. For example, an encrypted space or folder on the electronic device 200 may be used to store personal data and/or applications. In some embodiments, the containerization may involve application wrapping. For example, application wrapping container may involve using the operating system of the electronic device 200 and application program interfaces (APIs) to provide a sandboxed environment for personal data and/or applications. This may be performed for each set of personal data or for each application. In some embodiments, such a process may result in each application being enclosed in its own unique container. As such, a container may be placed around individual applications or sets of applications. Furthermore, the attempted access to the personal data may be detected based on API accesses of the containers. For example, the policy management module 220 may detect the API attempt or actual access to the personal data from one or more applications. The application wrapping container may rewire sensitive API calls to the personal data sources and filter access to the personal data sources. Such an application wrapping container may enable the monitoring of encrypted network traffic (e.g., SSL library hooking) and not allow access to the personal data sources by hooking and disabling the APIs of the applications with the application wrapping container or even disabling the functionality of the applications to transmit the personal data over a network or writing the personal data to an unsecure portion of the file system. As such, the detection of the access of personal data by one or more applications may be based on detecting API access (e.g., corresponding to an application wrapping container) and/or based on detecting a transmission of the personal data over a network. Further embodiments may detect access of personal data based on a server side characterization, as discussed in further detail below. Thus, the applications may be run in a container.

In some embodiments, the containerization process as disclosed above may be performed with respect to the storage of personal data. For example, a container wrapper may be configured on the electronic device 200 to be applied to personal data that is identified on the electronic device. Any access to the personal data must then use the interface (e.g., API) of the container wrapper applied to the personal data in order to access the personal data. As such, personal data may be identified on the electronic device 200 and places the container wrapper around the personal data. In some embodiments, the personal data may then be encrypted and/or placed elsewhere on the electronic device 200 (e.g., in an encrypted folder on the file system). In the same or alternative embodiments, a bloom filter may be used to detect access to personal data. For example, a bloom filter associated with the personal data may be stored on the device and when a 'hit' of the bloom filter is detected (e.g., an application accessing personal data associated with the bloom filter), a remote server may be notified of the 'hit' of the bloom filter and provide a confirmation or identification of the specific personal data subject to the 'hit' of the bloom filter. In some embodiments, the containerization of the personal data may involve the use of a hook mechanism, as previously disclosed with relation to the application wrapping container. For example, a hook may be performed at the file system level, at an operating system level, on a virtual machine (VM), or on hardware (e.g., a special processor or Field Programmable Gate Array configured to detect access to personal data). In some embodiments, an interrupt may be raised or called in response to a detection of access to the personal data in memory, to and from a storage device, to and from a network interface, and as a parameter call (e.g., intra-application or inter-application calls or an application to system call).

In some embodiments, the access to the personal data from one or more applications may be based on a transmission of the personal data. For example, the policy management module 220 may detect that an application has transmitted personal data from the electronic device 200 to another destination (e.g., a server or another device) over a network. As such, the detection of the access of personal data may be based on identifying one or more applications transmitting the personal data off of the electronic device 200. Thus, the detection of the access to the personal data may be based on network traffic and observing that personal data has been transmitted from the electronic device 200 over a network.

In some embodiments, the access to the personal data may also be detected based on a dynamic analysis. For example, a server may provide a characterization of an application that identifies what the application may leak (e.g., what kind of personal data is accessed and/or transmitted by the application). In some embodiments, a virtual private network (VPN) may be configured on the electronic device 200. The VPN may then be used to monitor access to personal data. For example, network access by applications may be monitored within the VPN environment and personal data that is transmitted over the network may be detected. Further details with regard to monitoring network access by application within the VPN environment are disclosed in U.S. patent application Ser. No. 14/071,366, entitled "METHODS AND SYSTEMS FOR SECURE NETWORK CONNECTIONS," filed on Nov. 4, 2013, which is incorporated herein by reference. Thus, network traffic associated with the electronic device 200 may be monitored for personal data leaving or being transmitted from the electronic device.

In some embodiments, the application container wrapper may be used to monitor a copy and paste function associated with the application. For example, the application container wrapper may hook the copy and paste function and apply the policy to the data contents of the copy and paste function being performed. Thus, the policy may monitor the copy and paste function for the presence of personal data. For example, if monitored personal data may be observed to be copied and pasted and such an act may be recorded or the copying and pasting of the monitored personal data may not be allowed.

In some embodiments, the policy may have been transmitted to a server 111 or to a piece of the infrastructure of the network 121 (such as a network access point or a switch or a router), which can observe the content of the communications from the device. The policy may be enforced on that location by inspecting the contents of the communications from the device for the presence of personal data. Notification messages can be sent to the owner or administrator of the device upon such detections. A communication whose content includes personal data may be blocked, depending on the specifics allowed in the policy. A command may be sent to the device to terminate the application which sent the personal data. The server or piece of network infrastructure may use special certificates in place of original site certificates to allow the inspection of SSL/TLS traffic; that is, the server or piece of network infrastructure is performing a sanctioned Man in the Middle (MiTM) operation in which there are two separate secured sessions from the server or piece of network infrastructure, one from the server or piece of network infrastructure to the original network destination using that location's valid certificate, and one from the server or piece of network infrastructure to the device using the specially provided certificate.

Figure 9:
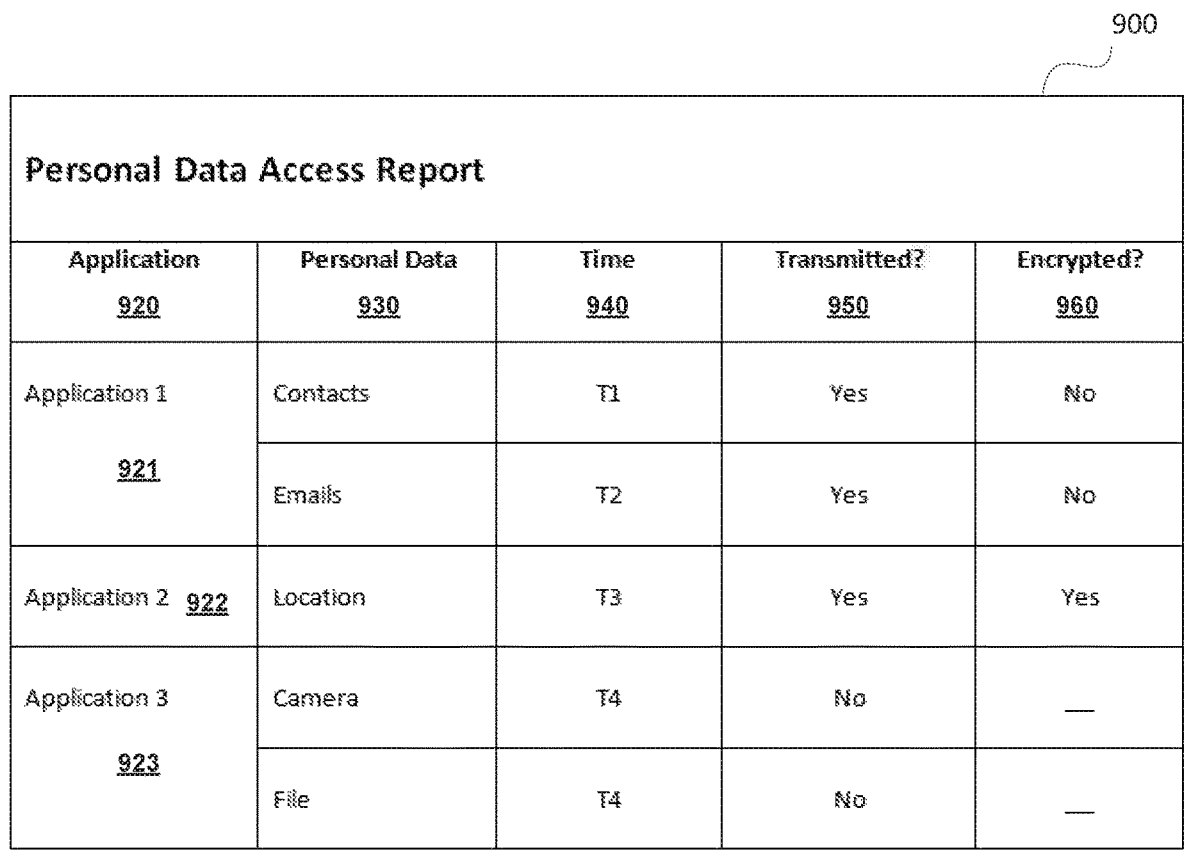
FIG. 9 illustrates an example of a personal data access report displaying access to personal data that is monitored based on a policy in accordance with some embodiments of the disclosure.

FIG. 9 illustrates an example of a personal data access report 900 displaying instances of access to monitored data based on a policy. In general, the personal data access report 900 may be generated by the policy reporter 360 of the policy management module 220 to display detected access of monitored personal data based on a policy by at least one application executed on the electronic device 200. The personal data access report 900 may be based upon a plurality of detected accesses of the monitored personal data. For example, the personal data access 900 may include information to identify and further describe an aggregation of a plurality of instances of access to personal data stored on the electronic device 200 by one or more applications.

As shown in FIG. 9, the personal data access report 900 may include multiple entries where each entry corresponds to at least one application that is executed on the electronic device 200 and has been detected to access monitored personal data within a particular time frame. For example, the monitored personal data access report 900 may be generated based on a particular time frame. Each detected access of personal data by an application during the time frame may be recorded and a plurality of the instances of detected access may be aggregated to form the personal data access report 900 for the time frame. As such, each of the entries 921, 922, and 923 of the personal data access report 900 may represent an application that has been detected to access at least one monitored personal data. In some embodiments, the personal data access report 900 may further include multiple fields for each of the entries. For example, an application identifier field 920, personal data identifier field 930, time field 940, transmission field 950, and an encrypted field 960 may be displayed as part of the personal data access report 900 for each of the entries 921, 922, and 923.

In some embodiments, the application identifier field 920 may identify an application that has been detected to access monitored personal data. For example, the application identifier field 920 may identify an application that is executed on the electronic device 200 that has been detected to access monitored personal data associated with the electronic device 200. In the example shown in FIG. 9, the entry 921 may be associated with the application identifier field 920 identifying a first application, the entry 922 may be associated with the application identifier field 920 identifying a second application, and the entry 923 may be associated with the application identifier field 920 identifying a third application. As such, a plurality of applications may be identified as having accessed monitored personal data. The personal data access report 900 may further include a personal data identifier field 930. In some embodiments, the personal data identifier field 930 may display information to identify a type of personal data that has been accessed by a corresponding application. For example, the personal data identifier field 930 may indicate that the first application corresponding to entry 921 has accessed personal data including contacts (e.g., contacts or phone numbers stored on the electronic device 200) and emails (e.g., emails accessed from an email account by the electronic device 200). The personal data identifier field 930 may also indicate that the second application corresponding to the entry 922 has accessed monitored personal data for a location (e.g., a location of the electronic device 200 obtained from a functionality of the electronic device such as a sensor) and that the third application corresponding to entry 923 has accessed personal data for a camera (e.g., camera photos created and stored on the electronic device 200) and one or more files on the file system of the electronic device 200. As such, the personal data identifier field 930 may identify a plurality of types of personal data that one or more applications have accessed. The time field 940 may indicate a time that each of the applications has accessed the corresponding personal data. For example, the time field 940 as shown identifies that the first application has accessed the contacts personal data at a first time and the emails personal data at a second time. The time field 940 further indicates that the second application has accessed the location personal data at a third time and that the third application has accessed both the camera personal data and the file system personal data at a fourth time. In some embodiments, the personal data access report 900 may further display a transmission field 950. In the same or alternative embodiments, the transmission field 950 may indicate whether an application from the entries 921, 922, and/or 923 has transmitted the personal data from the personal data identifier field 930 from the electronic device 200 to another destination (e.g., another device or server) over a network associated with the electronic device 200. For example, the transmission field 950 may indicate that the first application corresponding to entry 921 has transmitted both the contacts personal data and the email personal data from the electronic device 200 over a network. The transmission field 950 may further indicate that the second application corresponding to entry 922 has transmitted the location personal data from the electronic device 200 over a network and that the third application corresponding to entry 923 has not transmitted the camera personal data and file system personal data from the electronic device 200 over the network.

As shown in FIG. 9, the personal data access report 900 may further include an encrypted field 960. In some embodiments, the encrypted field 960 may indicate whether an application that has transmitted personal data off of the electronic device 200 did so while encrypting the personal data or transmitted the personal data without encrypting the personal data. For example, the encrypted field 960 may identify that the first application that transmitted the contacts personal data and email personal data did not encrypt either of the types of personal data that it accessed and subsequently transmitted. The encrypted field 960 may further identify that the second application encrypted the location personal data before transmitting the location personal data over the network. In some embodiments the personal data access report may also indicate where personal data was transmitted (e.g., a network destination).

The personal data access report 900 for a specific device may further include a count of all the items of a particular type of personal data that were accessed or a portion of or all of the actual personal data that was accessed. Furthermore, the personal data access report 900 may contain information regarding the context on the device at the time of access to the personal data. For example, the report may also record what applications were open at the time of access of the personal data, whether the electronic device was locked or unlocked, whether the accessing application was in the foreground (e.g., displayed) or not in the foreground (e.g., not displayed). In some embodiments, a personal data policy may have thresholds for each type of personal data access that is considered normal or allowable, for any application or for specific named applications, and the personal data access report may only report instances where the personal data policy is being violated.

As such, the personal data access report 900 may aggregate multiple instances of access of personal data by one or more applications. The personal data access report 900 may identify a particular type of personal data accessed by each of the applications, a time when the personal data was accessed by each of the applications, whether each application transmitted each accessed personal data off of the electronic device 200, and whether the personal data that was transmitted was encrypted or not. Thus, the personal data access report 900 may display the type of personal data or personal data related functionality of the electronic device that an application has accessed as well as additional details with regard to the type of personal data. Aggregated personal data access report information (with any personal data removed) may be made available separately to provide information to users about the personal data behavior or particular applications. For example, such information may be provided as part of a privacy report about applications, as additional information in application stores, or in databases of information about application characteristics or behavior. In some embodiments, an application installer on the electronic device 200 may use such a database of information about application characteristics or behavior in conjunction with a personal data policy to determine whether an application is allowed to be installed on the electronic device. For example, the user's or device's personal data policy may disallow applications which have a behavior of large scale access to contacts and the database of information about applications may indicate that application X has such a behavior. Thus, the application installer would not allow the installation of application X on the electronic device.

Although the personal data access report 900 shows certain types of fields and personal data, any type of personal data or fields identifying any type of information may be aggregated and/or displayed in the personal data access report 900. For example, the personal data access report 900 may further display a destination (e.g., IP address) that personal data was transmitted to, whether the electronic device was in a lock mode (e.g., an operation of the electronic device where user functionality of buttons or keys is disabled) or not in the lock mode, etc. In some embodiments, the personal data access report 900 may also display more detailed information. For example, specific contacts, emails, locations, camera photos, and files of the personal data that were accessed by the applications may be identified.

It may be normal for an application to access some personal data in the course of its operation. For example, an application that is designed to send emails or text messages may access a small number of contacts (e.g., a phone book, email list, etc.) on the electronic device and an application designed to backup data from the electronic device would in normal operation access all of the contacts on the electronic device. But it would not be normal for most applications to access a large number of contacts on the electronic device or all of the contacts on the electronic device. Recording the frequency of access to categories of personal data is used to prepare personal data access reports and may be used to develop policies on a per application basis regarding how much personal data may be accessed per application. For example, the application X that is designed for backing up contacts from the electronic device could have a policy that allows application X unlimited access to the contacts on the electronic device. However, the contacts policy for the electronic device may disallow any other application from accessing more than a configurable number or percentage of the contacts on the electronic device. For example, the policy could prevent other applications from accessing more than 20 contacts or more than 10% of the contacts on the device. The policy enforcement may have actions of reporting the attempted access, asking the user for permission for the application to perform the large scale access, or denying the large scale access. As such, a policy may be configured to allow for different amounts of personal data that may be accessed for different applications executed on the electronic device. The policy may define which types of personal data may be accessed by certain applications and which applications may not access a particular type of personal data.

In some embodiments, the policy may further define which destinations to which personal data may be transmitted. For example, the policy may allow a first set of personal data to be transmitted from the electronic device to a first network location (e.g., a website or server), but may not allow the first set of personal data to be transmitted from the electronic device to a second network location. Furthermore, in some embodiments, the policy may allow certain applications to be able to transmit personal data from the electronic device to a network location, but may not allow other applications to transmit personal data to a network location. In the same or alternative embodiments, the policy may allow specific applications to transmit specific personal data to a specific network location, but may not allow the applications to transmit other personal data to another network location or the specific personal data to another network location. As such, the policy may be used to allow or not allow access to personal data or transmission of personal data from the electronic device based on any combination of applications, personal data, and network locations (e.g., on a per application basis, per personal data basis, and/or per network location basis).

In some embodiments, the monitored personal data may be detected to be off of the electronic device. For example, a search engine may be used (e.g., by a server) to detect the monitored personal data at other servers or websites on the Internet. For example, the false or fake personal data as previously disclosed may be searched for on the Internet. In some embodiments, social network accounts for a user may be scanned to find or detect monitored personal data. Such a presence of personal data being off of the electronic device and found on another server or website may indicate that one or more applications executed on the electronic device is accessing personal data and transmitting the personal data off of the electronic device to another location. In some embodiments, a user may securely register his or her personal data with a search engine and the search engine may notify the user when the user's personal data is detected during a web crawl performed by the search engine.

In some embodiments, the personal data access report 900 may be sent to a server to be used to characterize personal data access patterns of one or more applications that are included in the personal data access report 900. For example, personal data access patterns may be identified by application or network location (e.g., website or network address). Thus, the server may be able to characterize which applications are accessing personal data as well as which network locations are receiving personal data that is transmitted from the electronic device.

Figure 10:
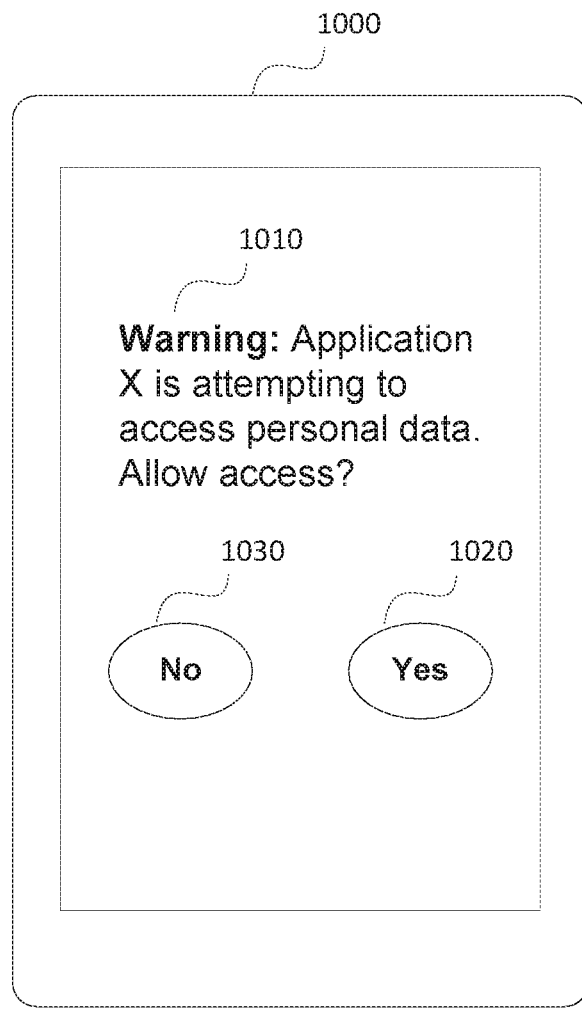
FIG. 10 illustrates an example graphical user interface notifying a user of an attempt to access monitored personal data in accordance with some embodiments.

FIG. 10 illustrates a graphical user interface 1000 notifying a user of an attempt to access monitored personal data. In general, the graphical user interface 1000 may provide a user of an electronic device 200 with an option to either allow or not allow access to monitored personal data by an application executed on the electronic device 200.

As shown in FIG. 10, the graphical user interface 1000 may display a notification 1010. For example, the notification 1010 may correspond to an attempt by an application executed on the electronic device 200 to access monitored personal data on the electronic device 200. In some embodiments, the notification 1010 may identify the application that is requesting or attempting to access personal data and/or the type of personal data that the application is requesting to access or is attempting to access. The graphical user interface 1000 may further include buttons to allow a user of the electronic device 200 to either allow or not allow the application to access the personal data. For example, the graphical user interface 1000 may include a 'no' button 1030 to not allow the application to access the personal data or a 'yes' button 1020 to allow the application to access the personal data. As such, a user of the electronic device 200 may be notified of each access by an application to personal data that is monitored based on the policy. Thus, the graphical user interface 1000 may provide a user of the electronic device 200 with a gated decision associated with applications attempting to access monitored personal data.

In some embodiments, a personal data access policy may be pushed to an electronic device from a server when a user logs in to the electronic device.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the method disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
   identifying, by a policy management module on a client computing device, personal data associated with the client computing device;
   receiving, by the policy management module, from a server, an analysis associated with the client computing device, wherein the analysis is generated by:
      creating, by the server, a set of fake personal data;
      transmitting, by the server, the fake personal data to the client computing device;
      tracking, by the server, access of the fake personal data by an application installed on the client computing device; and
      identifying, by the server, the application that accessed the fake personal data;
   creating, by the policy management module, a policy to disallow access of the personal data by the identified application;
   assigning the created policy to the client computing device; and,
   generating a report by the server to alert a user of the client computing device, the alert including access of fake personal data by the application.

2. The method of claim 1 wherein the access is tracked when the transmission of the fake personal data takes place off the client computing device over a network.

3. The method of claim 1, wherein the analysis associated with the client computing device further comprises analysis based on known behavior of specific applications that have been installed on the client computing device.

4. The method of claim 3, wherein the known behavior includes types of personal data that the specific applications installed on the client computing device are known to access.

5. The method of claim 1, wherein the fake personal data is unique to the client computing device or unique to a particular application installed on the client computing device or a combination thereof.

6. The method of claim 1, wherein the fake personal data is unique to a user who is using the client computing device.

7. The method of claim 6, wherein the fake personal data includes at least one of unique fake phone number or unique fake email address of the user who is using the client computing device.

8. The method of claim 7, further comprising reporting to the user the usage of unique fake phone number or the unique fake email address by the application when a communication is received at the unique fake phone number or at the unique fake email address.

9. The method of claim 8, wherein the reporting to the user further includes identification of the application as an abuser of personal data.

10. The method of claim 8, further comprising tracking an origin of the communication.

11. The method of claim 1, wherein the created policy is distributed to multiple client computing devices.

12. The method of claim 1, wherein the analysis further comprises tracking, by the server, the execution of the application on the client computing device.

13. A system comprising a client computing device with at least one processor and memory and instructions that, when executed by the at least one processor, cause a policy management module on the client computing device to:
   identify personal data associated with the client computing device;
   receive, from a server, an analysis associated with the client computing device, wherein the analysis is generated by a server that:
      creates a set of fake personal data;
      transmits the fake personal data to the client computing device;
      tracks access of the fake personal data by an application installed on the client computing device; and
      identifies the application that accessed the fake personal data;
   receive at the client computing device, from the server, a policy to disallow the access of personal data by the identified application on the client computing device, the policy being created by the server and assigned to the client computing device; and,
   generate a report by the server to alert a user of the client computing device, the alert including access of fake personal data by the application.

14. The system of claim 13, wherein the fake personal data is unique to the client computing device or unique to a particular application installed on the client computing device or unique to a user of the client computing device, or a combination thereof.

* * * * *